US012707394B2

(12) United States Patent
Thubert et al.

(10) Patent No.: US 12,707,394 B2
(45) Date of Patent: Aug. 11, 2026

(54) ACCESS POINT DUTY CYCLED OPERATION AND POWER SAVING

(71) Applicant: Cisco Technology, Inc., San Jose, CA (US)

(72) Inventors: Pascal Thubert, Roquefort les Pins (FR); Jean-Philippe Vasseur, Saint Martin D'uriage (FR); Eric M. Levy-Abegnoli, Valbonne (FR); Patrick Wetterwald, Mouans Sartoux (FR); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 350 days.

(21) Appl. No.: 18/334,958

(22) Filed: Jun. 14, 2023

(65) Prior Publication Data

US 2024/0422687 A1 Dec. 19, 2024

(51) Int. Cl.
*H04W 52/02* (2009.01)

(52) U.S. Cl.
CPC ... *H04W 52/0248* (2013.01); *H04W 52/0206* (2013.01)

(58) Field of Classification Search
None
See application file for complete search history.

(56) References Cited

U.S. PATENT DOCUMENTS

2005/0018624 A1* 1/2005 Meier ................... H04L 61/103 370/318
2007/0281658 A1* 12/2007 Chou ................ H04W 52/0216 455/343.2
2008/0220788 A1* 9/2008 Stanwood ................. H04L 5/06 455/450
2011/0069650 A1* 3/2011 Singh ................ H04W 52/0216 370/311
2012/0134280 A1* 5/2012 Rotvold ................. H04B 17/24 370/252

(Continued)

FOREIGN PATENT DOCUMENTS

CN 109660375 B 10/2020
CN 111083655 B 8/2022
EP 3826368 A1 * 5/2021 ........ H04W 52/0206

OTHER PUBLICATIONS

Choudhury N., et al., "Dynamic Adaptation of Duty Cycling with MAC Parameters in Cluster Tree IEEE 802.15.4 Networks", IECON 2017—43rd Annual Conference of the IEEE Industrial Electronics Society, IEEE, Oct. 29, 2017, pp. 3449-3454, XP033280074, DOI: 10.1109/IECON.2017.8216584, Abstract, Sections I-VI.

(Continued)

*Primary Examiner* — Nicholas Sloms
(74) *Attorney, Agent, or Firm* — Patterson + Sheridan, LLP

(57) ABSTRACT

Techniques for improved networking are provided. An access point (AP) determines an AP duty cycle based at least in part on transmission activity of a station (STA) associated to the AP. The AP duty cycle is signaled via one or more beacon frames transmitted by the AP. The AP exchanges data in accordance with the AP duty cycle, comprising exchanging data with the STA during one or more active periods indicated by the AP duty cycle, and sleeping during one or more inactive periods indicated by the AP duty cycle.

20 Claims, 7 Drawing Sheets

(56) References Cited

U.S. PATENT DOCUMENTS

| | | | | |
|---|---|---|---|---|
| 2013/0235773 | A1* | 9/2013 | Wang | H04W 52/0206 370/311 |
| 2015/0124706 | A1* | 5/2015 | Kim | H04W 16/14 370/328 |
| 2015/0237647 | A1* | 8/2015 | Glik | H04W 52/0216 370/336 |
| 2016/0105850 | A1* | 4/2016 | Wentink | H04W 52/0219 370/311 |
| 2018/0279192 | A1* | 9/2018 | Raissinia | H04W 36/38 |
| 2019/0045543 | A1* | 2/2019 | Valls | H04W 74/0808 |
| 2020/0128522 | A1* | 4/2020 | Fischer | H04W 72/541 |
| 2020/0359327 | A1 | 11/2020 | Bhanage et al. | |
| 2021/0021988 | A1* | 1/2021 | Boliek | H04L 67/568 |
| 2022/0217630 | A1 | 7/2022 | Chen et al. | |
| 2022/0377664 | A1 | 11/2022 | Nguyen et al. | |
| 2023/0073197 | A1 | 3/2023 | Kincaid et al. | |
| 2023/0080467 | A1 | 3/2023 | Homchaudhuri et al. | |
| 2023/0239739 | A1 | 7/2023 | Thubert et al. | |
| 2023/0397101 | A1* | 12/2023 | Abotabl | H04W 72/1263 |
| 2024/0064832 | A1* | 2/2024 | Asterjadhi | H04W 52/0206 |

OTHER PUBLICATIONS

Neugebauer M., et al., "Duty Cycle Adaptation with Respect to Traffic", 10th IEEE International Conference on Emerging Technologies and Factory Automation, IEEE, Piscataway, NJ, USA, vol. 2, Sep. 19, 2005, pp. 425-432, XP010905514, DOI: 10.1109/ETFA.2005.1612709, ISBN: 978-0-7803-9401-8, Abstract, Sections 1-5.
Partial International Search Report for International Application No. PCT/US2024/033639, mailed Oct. 10, 2024, 12 Pages.
International Search Report and Written Opinion for International Application No. PCT/US2024/033639, mailed Dec. 2, 2024, 21 Pages.

* cited by examiner

Determine duty cycle based on transmission activity
305

Signal duty cycle
310

Active period?
315

Yes

Exchange data with station(s)
320

No

Ongoing exchange(s)?
325

Yes

Complete exchange(s)
330

No

Sleep during inactive period
335

Receive inactive period indication(s) 505

Indicate inactive time(s) 510

AP active period? 515

No

Yes

Exchange data with AP(s) 520

Exchange complete? 525

Yes

No

Complete exchange 530

STA inactive period? 535

Yes

Enter inactive period 540

No

Exchange data with active AP(s) 545

ACCESS POINT DUTY CYCLED OPERATION AND POWER SAVING

TECHNICAL FIELD

Embodiments presented in this disclosure generally relate to networking. More specifically, embodiments disclosed herein relate to duty cycling to improve networking.

BACKGROUND

A variety of wireless networking technologies exist. In many approaches, one or more network devices are used to provide wireless connectivity to connected devices. The particular nomenclature and operations may vary depending on the particular technology. For example, wireless local area networks (WLANs) implementing WiFi may use access points (APs), while other network technologies may refer to the network devices as ground stations, base stations, and the like. Generally, network devices are used to facilitate communication between connected devices (e.g., between two user devices connected to the network) and/or between connected devices and one or more systems or devices outside of the network (e.g., via a broader network, such as the Internet). Accordingly, to service these exchanges and provide a robust network, the network connectivity devices generally operate continuously, exchanging data with any connected devices that desire such communications.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
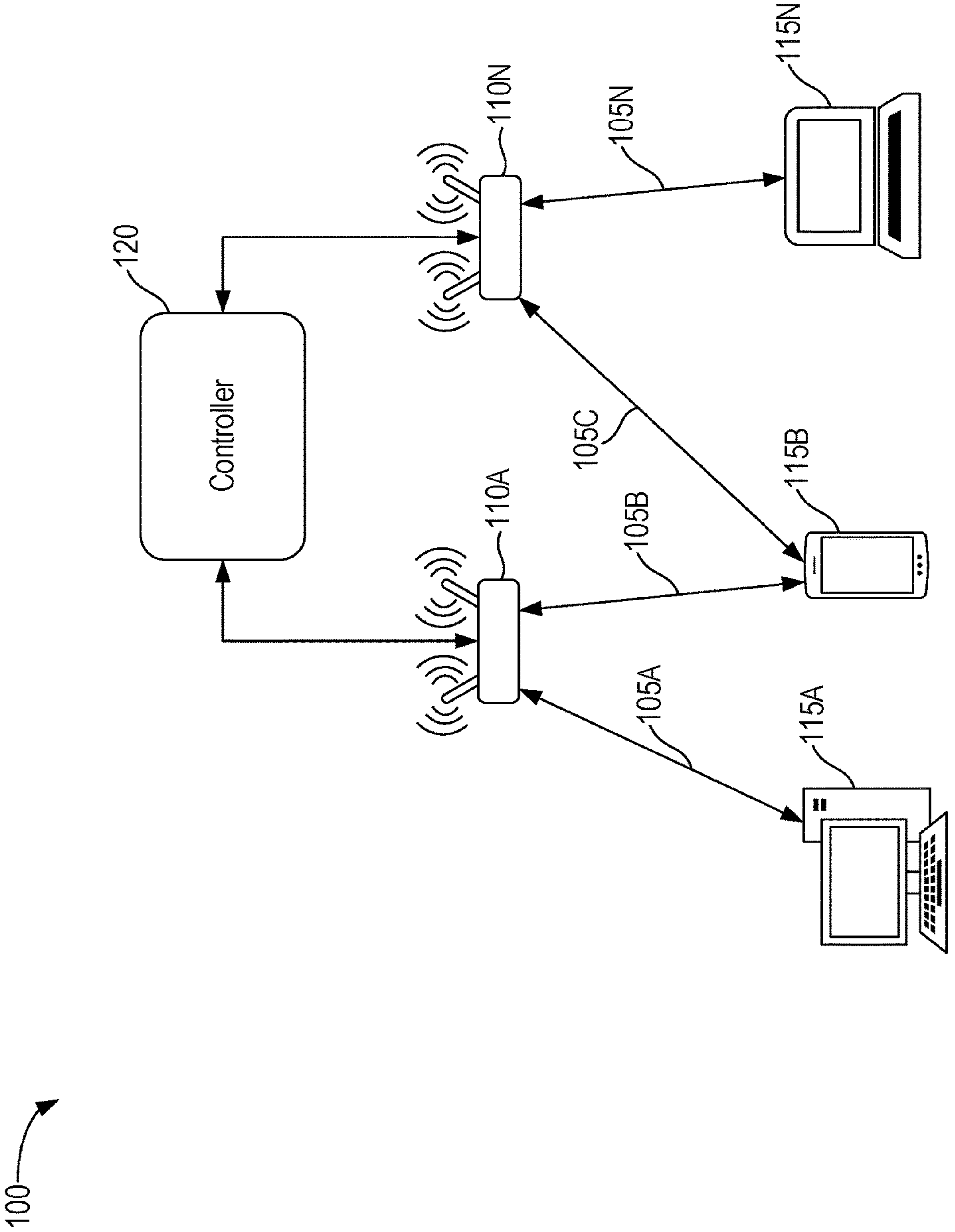
FIG. 1 depicts an example environment for AP duty cycling, according to some embodiments of the present disclosure.

One embodiment presented in this disclosure is a method, including determining, by a first access point (AP), a first AP duty cycle based at least in part on transmission activity of a first station (STA) associated to the first AP; signaling the first AP duty cycle via one or more beacon frames transmitted by the first AP; and exchanging data, by the first AP, in accordance with the first AP duty cycle, comprising: exchanging data with the first STA during one or more active periods indicated by the first AP duty cycle; and sleeping, by the first AP, during one or more inactive periods indicated by the first AP duty cycle.

Other embodiments in this disclosure provide non-transitory computer-readable mediums containing computer program code that, when executed by operation of one or more computer processors, performs operations in accordance with one or more of the above methods, as well as systems comprising one or more computer processors and one or more memories containing one or more programs which, when executed by the one or more computer processors, performs an operation in accordance with one or more of the above methods.

Example Embodiments

Embodiments of the present disclosure provide improved networking via access point (AP) duty cycling in wireless networks.

Generally, some conventional wireless networks require that network devices (e.g., APs) remain active and ready to exchange data with connected devices at all times, regardless of the current or future load on the network (e.g., regardless of the time, number of connected devices, amount or criticality of network traffic, and the like). In some conventional systems, some connected devices (e.g., client devices, user equipment, stations, and the like) can optionally utilize duty cycling to periodically engage in active and inactive periods of activity (e.g., exchanging data via the network for some period of time before entering an inactive state, such as a sleep state) in order to conserve power or otherwise reduce resource usage.

However, as the network is generally expected to be "always ready," network devices (such as APs) are generally not able to engage in such duty cycling using conventional approaches. This can be particularly problematic in low-load circumstances, where substantial power is wasted when the AP is on/active but is handling little or no traffic. For example, it may be the case that the current traffic through a given AP could be handled even if a ratio of duty cycling was applied, which could save significant amounts of energy.

In some embodiments of the present disclosure, APs can determine appropriate duty cycling that can reduce power usage without network disruption. In some embodiments, the AP(s) signal their duty cycle period(s) in transmitted beacons, allowing connected (or nearby) devices to determine the AP availability. In some embodiments, client devices (also referred to as stations or STAs) can signal their tolerance for AP duty cycling, such as the amount of lag or latency that they can experience (e.g., due to the AP sleeping) without any impact (or without impact that exceeds some defined criteria or thresholds) on its operations. This may allow the AP(s) to tune their duty cycling values appropriately. For example, in some embodiments, one or more stations may indicate the maximum time that the AP can remain offline with little to no impact on the station's operations. This allows the AP to tune its duty cycle and meet the needs of the given station.

In some embodiments, using appropriate duty cycling, it may be possible to provide equivalent or improved network connectivity with reduced power. For example, it may be possible to operate one AP full time or three APs 33% of the time using the same amount of power. However, if each station connects to and/or is steered to its nearest AP, each AP may consume less energy than if more distant stations are serviced (e.g., due to reduced transmission power requirements). Therefore, utilizing multiple APs with a defined duty cycle may consume less energy than a single AP at full cycle, thereby enabling increased network throughput while consuming less power. In some embodiments, the APs in a network can therefore coordinate and agree on their duty-cycled services to enable each to serve one or more clients while saving power.

In some embodiments, in addition to or instead of evaluating uptime needs or preferences of connected devices, the system may use various predictive techniques to predict future traffic from associated devices (e.g., using trained machine learning (ML) models) to tune their duty cycling. For example, if some connected devices cannot or are not configured to signal, to the AP, the amount of lag that they can experience without concern, models may be used to predict the allowable lag. Forecasting ML models may therefore be used in some embodiments to predict the future activity of one or more given client devices associated to a given AP, based on the past or historical traffic.

In some embodiments, the duty cycle schedule information can be indicated via beacons, such as by signaling the duty cycling operations of the AP over the period between now (when a beacon is sent) and the time when the subsequent beacon will be sent, and/or over the next few beacons (e.g., for the next five beacons). In some aspects, the signaling indicates which time(s) the AP will be active (e.g., sending and/or receiving data) and/or which time(s) the AP plans to enter inactive state (e.g., sleeping or otherwise refraining from sending data). In some embodiments, once an active time is signaled for a future period, the AP may comply with this schedule (e.g., the AP may refrain from sleeping at the designated time, even if there is no network activity at the time). In subsequent beacon(s) that signal the schedule for the same future period, however, the AP may signal additional wake times and/or longer wake times during the future period. This may allow stations to miss beacon(s) and still know or understand at least the minimum times/windows when the AP will be active.

In some embodiments, using the duty cycling techniques discussed herein, multiple APs may be configured to serve the same space and possibly using the same channels. That is, while conventional approaches generally avoid multiple APs using the same channel(s) in the same place (due to interference), some embodiments of the present disclosure enable this overlap to exist without interference by coordinating duty cycles. For example, in some embodiments, neighboring APs may coordinate their duty cycle service such that only one AP may send/receive data using a given channel at a given point of time. In some embodiments, stations may be steered to connect to or use the nearest AP to the given station, in which case each station may determine to operate based in the duty cycle of that nearby AP (e.g., only exchanging data with the nearest AP, and only when the nearest AP is active). In some embodiments, one or more stations may additionally or alternatively determine to leverage more than one AP, operating on more than one association in the matching duty cycles. That is, when one AP enters an inactive state, station(s) may transition to using another AP (e.g., the next AP that re-enters active state) to continue the communications.

In some embodiments, at the end of a scheduled active time for an AP, a transmitting station may decide to continue with the current transmission, causing the AP to remain active until the end of the transmission, at which point the AP may enter a delayed inactive state (returning to active state based on the previously signaled duty cycle). In some embodiments, the station may leverage frame preemption, where the station can begin sending a frame, signal that it will complete the transmission subsequently, and enter an inactive or sleep state while the AP is offline. When the AP returns to active state, the station may resume the transmission. In some embodiments, if frame recombination is performed by another system (such as a network controller), the station may switch to another AP to continue the preempted transmission (rather than entering an inactive state), and the controller may recombine the frame portions.

As used herein, a period, state, window, or time may be referred to as "inactive" to indicate that a device (e.g., an AP) does not exchange data via the network during the period. In some embodiments, this "inactive" state may similarly be referred to as a "sleep" state. In some embodiments, although the device may be in an inactive state with respect to transmissions, the device may continue to perform other operations during the inactive state. Relatedly, as used herein, a period, state, window, or time may be referred to as "active" to indicate that a device (e.g., an AP) does exchange data via the network during the period. As used herein, "exchanging" data may include transmitting data to another entity and/or receiving data from another entity (e.g., transmitted by the other entity). In some embodiments, this "active" state may similarly be referred to as an "awake" or "wake" state. In some embodiments, although the device may be in an active state with respect to transmissions, the device may or may not also perform other operations during the active state.

FIG. 1 depicts an example environment 100 for access point duty cycling, according to some embodiments of the present disclosure.

In the illustrated example, a set of APs 110A-N (collectively, APs 110) provide network connectivity (e.g., via a WiFi network, or other WLAN technology) for a set of stations (STAs) 115A-N (collectively, STAs 115). Although the illustrated example depicts APs 110, as discussed above, embodiments of the present disclosure may be readily used with other network technologies, including cellular technology. The APs 110 are generally representative of any network device that provides network connectivity to client devices by exchanging data with the client(s) and/or with other entities. Although two APs 110 are depicted, in embodiments, there may be any number of APs providing the network.

As illustrated, the STAs 115 generally correspond to devices that connect to or use the network (provided by APs 110) to exchange data with other devices (either devices that are also on the network or associated to an AP 110, or remote devices on other networks). As discussed above, the STAs 115 may additionally or alternatively be referred to as user devices, client devices, clients, and the like. Each STA 115 may generally comprise any computing device capable of wireless communication, such as desktop computers, smartphones, laptop computers, and the like. Although three STAs 115 are depicted in the illustrated example, in embodiments, there may be any number of STAs associated to the network.

As indicated by links 105A-N (collectively, links 105), the depicted STAs 115 are generally "associated to" the APs 110. That is, the STAs 115 have established communication links with the APs 110, allowing them to exchange data via the links 105 (as compared to non-associated STAs, which may receive beacon frames but may otherwise be unable to exchange substantive data with the APs). In the illustrated example, the STA 115A is associated to the AP 110A (as depicted by link 105A), the STA 115B is associated to the AP 110A (as depicted by link 105B) and the AP 110N (as depicted by link 105C), and the STA 115MN is associated to the AP 110N (as depicted by link 105N).

Further, in the illustrated example, the APs 110 are each communicatively coupled with a controller 120 (e.g., a WLAN controller). In some embodiments, the controller can facilitate duty cycle coordination among the APs 110. For example, the Aps 110 may indicate or negotiate their active periods and/or inactive periods via the controller 120. In some embodiments, the APs 110 may negotiate or coordinate their duty cycles directly. In some embodiments, to perform frame preemption across APs 110, the controller 120 may perform frame recombination, as discussed in more detail below.

In some embodiments, each AP 110 may signal or indicate its duty cycle (e.g., indicating specific future time(s) when it will be active), such as via beacon frames broadcast in the network. In some embodiments, one or more of the STAs 115 may signal or indicate their needed or preferred duty cycle, such as the maximum inactive communication time (e.g., the largest amount of time that can pass without sending or receiving data at the STA 115 before operations of the STA 115 are adversely impacted). For example, some devices (such as augmented reality or virtual reality headsets) may have low tolerance for lag (e.g., indicating very small maximum inactive times), while other devices (such as Internet of Things (IoT) devices) may have relatively large inactive tolerance (e.g., able to refrain from communicating for seconds or minutes at a time without substantial harm). Generally, the latency tolerance of a given STA 115 may be determined or configured (e.g., by a network administrator, manufacturer of the STA 115, and/or user of the STA) for each STA based on the applications it is executing, purposes it serves, and the like.

In some embodiments, when an AP 110 enters inactive state, each associated STA 115 may determine whether to similarly enter an inactive state (with respect to transmissions), force completion of the current transmission, and/or transfer transmissions to other AP(1) 110. For example, suppose the STA 115B is exchanging data with the AP 110A when an inactive period of the AP 110A begins. In some embodiments, the STA 115B may determine to pause its transmissions (e.g., after the current frame, or immediately using frame preemption) and enter an inactive transmission state until the AP 110A re-enters an active period. In some embodiments, if frame preemption is used, the STA 115B may resume the transmission of the preempted frame when the AP 110A returns to active status. In other embodiments, rather than entering a sleep state, the STA 115B may begin the next transmission via the AP 110N.

In some embodiments, when the AP 110A enters the inactive period, the STA 115B may indicate that it desires to complete its current transmission, causing the AP 110A to delay entering the inactive state. Once the transmission ends, the AP 110A may enter a (shortened) inactive state. In some embodiments, the STA 115B may use frame preemption to indicate a pause in the transmission to the AP 110A, allowing the AP 110A to enter inactive state after forwarding the preempted frame portion to the controller 120. The STA 115B may then resume transmission of the preempted frame via the AP 110N (if it is in an active state). In some embodiments, the AP 110N may similarly forward the remaining portion of the preempted frame (and subsequent frames) to the controller 120, which may then recombine the preempted frame and forward it to its destination (e.g., outside of the local network).

In some embodiments, as discussed above, the APs 110 and/or controller 120 may coordinate their duty cycles such that at least one (or at most one) AP 110 is active at any given time. That is, in some embodiments, the duty cycle of the APs 110 may be tuned such that they alternate in time (e.g., where the AP 110A is active for a period while the AP 110N sleeps, then the AP 110A enters inactive state while the AP 110N wakes and enters active operations). This may allow both APs 110 to use the same channel(s) (e.g., the same radio frequencies) in overlapping physical coverage areas without causing interference between the APs 110. In some embodiments, STAs 115 may be steered between the APs 110 as needed (e.g., to the nearest AP, or to the now-active AP).

In some embodiments, if such an alternating duty cycle is insufficient (e.g., due to increased traffic demands), the APs 110 may modify their duty cycle(s) to provide increased uptime (potentially on different channels).

In some embodiments, as discussed above the APs 110 may determine or generate their duty cycles based on traffic information or metrics, such as the minimum uptime and/or maximum downtime indicated by one or more associated STAs 115, and/or based on current or historical traffic patterns. In some embodiments, the AP(s) 110 and/or controller 120 can evaluate the traffic metrics over a period of time (e.g., the last minute, hour, day, weekday, and the like) to predict traffic for the next period of time (e.g., over the next few seconds). For example, the system may evaluate or predict collective traffic needs across all associated STAs based on current and/or historical usage.

In some embodiments, the APs 110 and/or controller 120 can use one or more predictive machine learning models, such as a recurrent neural network (RNN) or long short-term memory (LSTM) model to predict future traffic needs of each given STA 115 (or of each STA that has not indicated its needs). That is, the system may predict future traffic on a per-STA basis using one or more trained models. This prediction may be applied for STAs 115 that do not report their needs or usage, while relying on the explicit signaling from other STAs 115 in some embodiments. In other embodiments, the system may generate such predictions for all STAs 115 (including those that signal their maximum downtime). This may allow the system to determine that the actual needs are greater or smaller than indicated, in some embodiments.

In these ways, the APs 110 and/or controller 120 can generate and tune duty cycles that can allow for substantial reduction in energy consumption as well as reduction in interference, while maintaining high network quality (e.g., in terms of throughput or availability).

Figure 2:
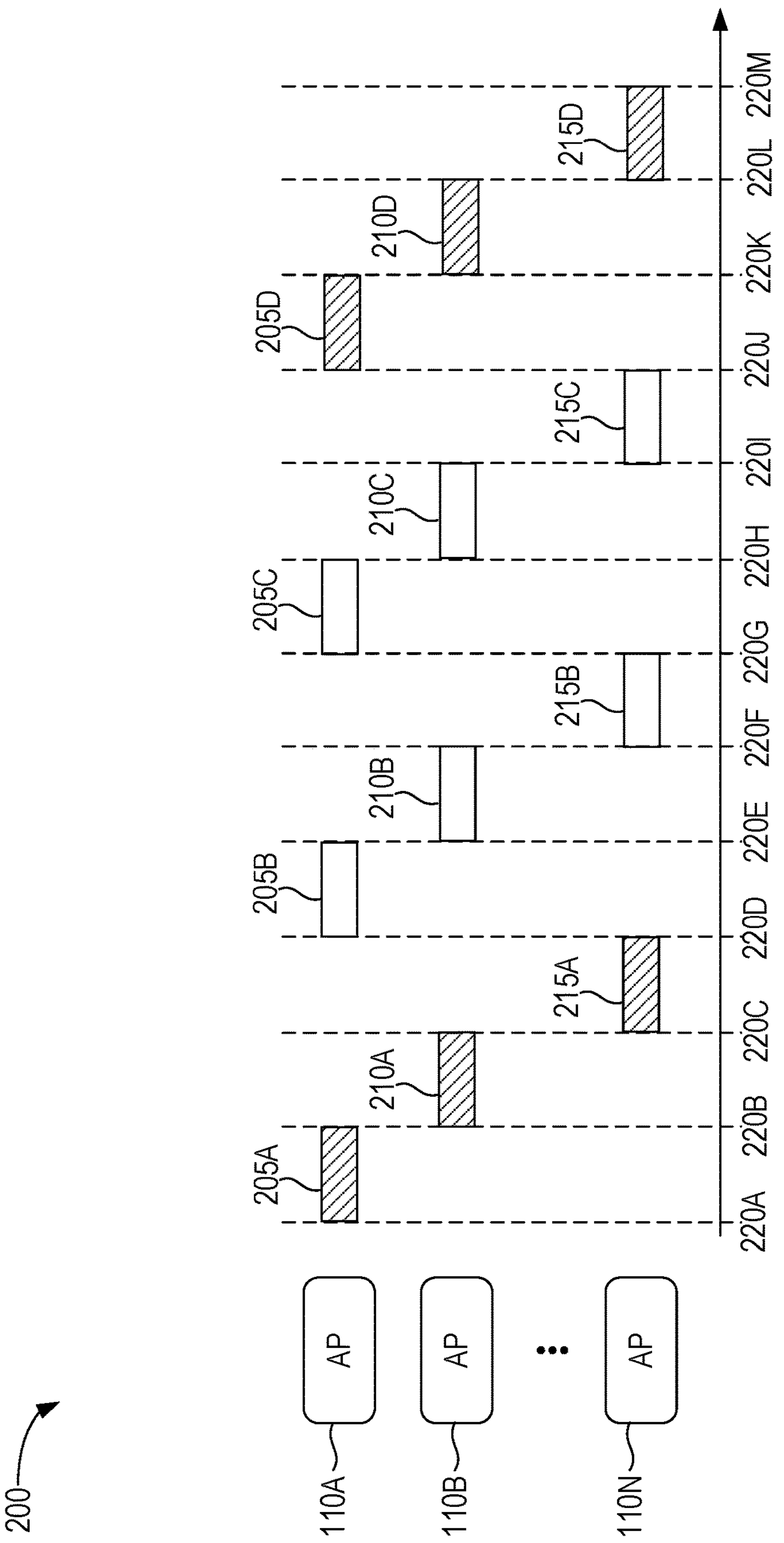
FIG. 2 depicts an example timeline of coordinated AP duty cycling, according to some embodiments of the present disclosure.

FIG. 2 depicts an example timeline 200 of coordinated access point duty cycling, according to some embodiments of the present disclosure.

In the illustrated example, three APs 110A-N (collectively, APs 110) coordinate their duty cycles in a dotted-line fashion, where the uptimes or active periods of each AP 110 (indicated by blocks 205, 210, and 215) are staggered/overlapped with the downtimes or inactive periods of the other APs 110. That is, at each given point in time, the depicted duty cycles have exactly one AP 110 of the set of APs 110 in an active state, while the other APs 110 are in an inactive state. In some embodiments, as discussed above, such coordination can allow the APs 110 to share radio frequencies (e.g., use the same channels) in the same physical space (or in overlapping regions) without interference. Additionally, as discussed above, if each STA is configured to utilize its nearest AP 110, the overall power consumption may be reduced, as compared to conventional (non-duty cycled) operations of a single AP. That is, the three APs 110A-N may be able to provide equal or improved connectivity to connected devices with the same or less energy as a single AP that is not duty-cycled.

In some embodiments, as discussed above, one or more STAs may use multiple APs 110 to transmit and/or receive data. For example, a STA may begin transmission via AP 110A during the interval between times 220A and 220B. When time 220B is reached (and the AP 110A enters inactive state), the STA may complete the current frame and/or use frame preemption to stop the transmission, and begin transmission via AP 110B, which enters active state at time 220B. This can allow STAs to continuously transmit and receive data, if desired, despite the AP duty cycling.

In some embodiments, the APs 110 can coordinate their duty cycles by communicating with each other (directly or via a controller). For example, after determining or predicting the future traffic loads and/or needs of associated devices, each AP 110 may determine its minimum uptime (e.g., the minimum duration of each active period) and/or maximum sleep interval or downtime (e.g., the maximum duration of each inactive period) based on the predicted transmission activity of the connected STAs. That is, each AP 110 may generate or determine a duty cycle that will ensure it can support its associated STAs.

In some embodiments, each AP 110 can thereafter report or indicate its determined duty cycle to neighbor AP(s) 110 and/or to a controller. In this way, the AP(s) 110 and/or controller can synchronize the duty cycles, which may include shifting one or more in time and/or changing the duration(s) of one or more periods in one or more duty cycle(s). For example, suppose AP 110A determines that its duty cycle should have 100 milliseconds of active transmission followed by 100 milliseconds of an inactive state, and AP 110B determines that its duty cycle should have 80 milliseconds of active transmission followed by 120 milliseconds of an inactive state. In an embodiment, the system may determine to align the end of AP 110A's active period with the beginning of AP 110B's active period, extend AP 110B's active period and/or reduce AP 110B's inactive period, and the like in order to align the duty cycles.

Although the illustrated example depicts non-overlapping duty cycles, in some aspects, some or all of the periods may have at least some overlap. For example, in some embodiments, there may be periods where two or more APs 110 are in an active state. Similarly, in some embodiments, there may be periods where all of the APs 110 are in an inactive state. Further, in some embodiments, it may not be possible or practical or synchronize the duty cycles, and the APs 110 may operate independently.

In the illustrated timeline 200, at time 220A, AP 110A begins an active state (as illustrated by block 205A). As indicated by the crosshatching, the AP 110A may broadcast one or more beacon frames during the block 205A to advertise its duty cycle (e.g., its future uptimes) for some period or duration. For example, the AP 110A may indicate the specific time(s) when it will be awake, at least until the next beacon (which may be broadcast at block 205D) that will have an updated schedule. Specifically, as illustrated, the AP 110A is active between times 220A and 220B, inactive between times 220B and 220D, active between times 220D and 220E (without transmitting beacons during this time, as indicated by block 205B), inactive between times 220E and 220G, active between times 220G and 220H (without transmitting beacons, as illustrated by block 205C), inactive between times 220H and 220J, active between times 220J and 220K (which may include transmission of one or more beacons, as illustrated by block 205D), and inactive between times 220K and 220M.

Additionally, in the illustrated example, the AP 110B is inactive between times 220A and 220B, active between times 220B and 220C (which may include transmission of one or more beacons, as illustrated by block 210A), inactive between times 220C and 220E, active between times 220E and 220F (without transmitting beacons during this time, as indicated by block 210B), inactive between times 220F and 220H, active between times 220H and 220I (without transmitting beacons, as illustrated by block 210C), inactive between times 220I and 220K, active between times 220K and 220L (which may include transmission of one or more beacons, as illustrated by block 210D), and inactive between times 220L and 220M.

Further, in the illustrated example, the AP 110N is inactive between times 220A and 220C, active between times 220*c* and 220D (which may include transmission of one or more beacons, as illustrated by block 215A), inactive between times 220D and 220F, active between times 220F and 220G (without transmitting beacons during this time, as indicated by block 215B), inactive between times 220G and 220I, active between times 220I and 220J (without transmitting beacons, as illustrated by block 215C), inactive between times 220J and 220L, and active between times 220L and 220M (which may include transmission of one or more beacons, as illustrated by block 215D).

Although the illustrated example depicts broadcasting beacons (which may include or indicate the future uptimes/duty cycle of the AP 110) periodically (e.g., every third wake), in some embodiments, the APs 110 may transmit one or more beacons during each active period (e.g., at the beginning of each active period). Additionally, although the illustrated example suggests strict end times for each active period, in some embodiments, one or more active windows may be extended as discussed above (e.g., due to a STA continuing to transmit data). For example, the AP 110A may extend the active period indicated by block 205B if an associated device desires to complete its current transmission. Though three APs 110 are depicted, in embodiments, any number of APs may coordinate their duty cycles to enhance network reliability and throughput while minimizing energy consumption.

Figure 3:
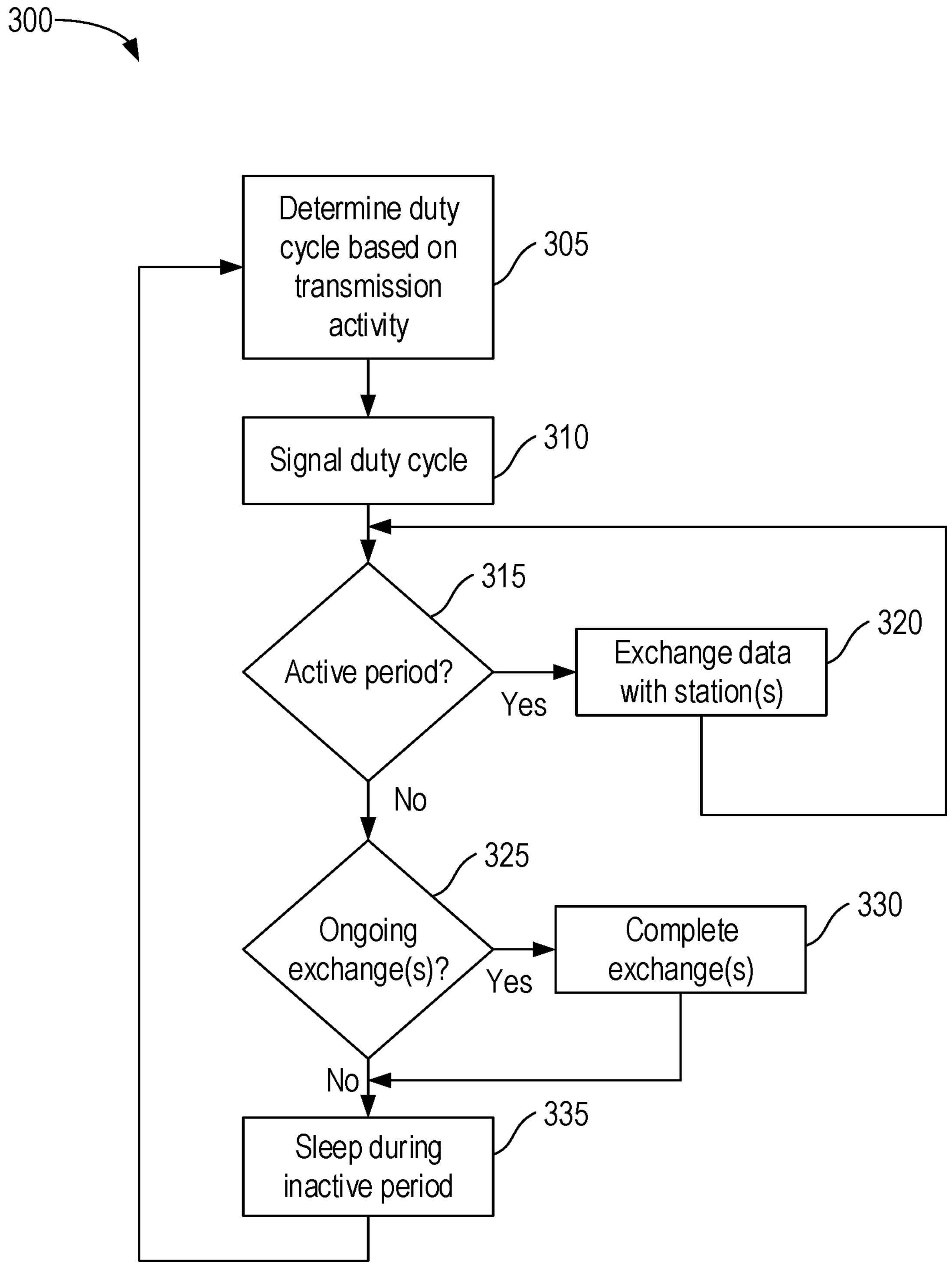
FIG. 3 is a flow diagram depicting an example method for AP duty cycling, according to some embodiments of the present disclosure.

FIG. 3 is a flow diagram depicting an example method 300 for access point duty cycling, according to some embodiments of the present disclosure. In some embodiments, the method 300 is performed by an AP, such as AP 110 of FIG. 1 and/or FIG. 2.

At block 305, the AP determines its duty cycle based on transmission activity of associated STAs. For example, as discussed above, one or more STAs may indicate their current and/or future traffic load (e.g., indicating the amount of data they expect to transmit and/or receive, the periodicity of the data, the maximum delay or interval between active periods that will allow the STA to satisfy its connectivity criteria, and the like). In some embodiments, the AP may additionally or alternatively use various predictive modeling techniques to predict the future transmission activity of one or more STAs. One example of determining the duty cycle is discussed in more detail below with reference to FIG. 4.

At block 310, the AP signals its duty cycle to nearby devices. For example, the AP may indicate its duty cycle in beacons which are broadcast by the AP. In some embodiments, this signaling allows both connected or associated devices, as well as non-connected or non-associated devices, to determine the duty cycle. In some embodiments, as discussed above, signaling the duty cycle includes indicating the times (or windows of time) when the AP will be active. For example, the AP may indicate the start and end times of each active period for the next few cycles and/or until the next beacon is reached. In some embodiments, as discussed above, the AP may subsequently determine to add additional wake time, but may not remove any previously advertised wake time. This can allow STAs to rely on indicated wake times, even if the STA subsequently misses an updated advertisement of a changed duty cycle (e.g., because the STA is sleeping).

At block 315, the AP determines whether an active period has begun or is ongoing (based on the duty cycle). If so, the method 300 continues to block 320, where the AP exchanges data with associated STAs during the active period. The method 300 then returns to block 315 to determine whether the active period is still ongoing.

Returning to block 315, if the AP determines that it is not in an active period (e.g., that the active period has ended), the method 300 continues to block 325, where the AP determines whether there are any ongoing data exchanges with associated STAs. For example, the AP may determine whether it is still completing any frame transmissions and/or any associated STAs are still completing any frame transmissions. If so, the method 300 continues to block 330, where the AP completes the current exchanges/transmissions (but does not begin new ones). That is, the AP may finish transmitting or receiving any currently pending frames, without beginning a new transmission. In some embodiments, the STA and/or AP may signal, via management frames, a desire to complete the ongoing exchange. In some embodiments, rather that completing the exchange, the STA and/or AP may use frame preemption to stop the ongoing transmissions. In some embodiments, if frame preemption is used, the AP may transmit the portion of the frame that it has already received to a controller device, which is used to recombine the frame (when subsequent portion(s) are received). In other embodiments, the AP may maintain the frame portion locally, and recombine the frame when the next portion is received (e.g., during the next active period). The method 300 then continues to block 335.

Returning to block 325, if the AP determines that there are no ongoing exchanges, the method 300 continues to block 335. At block 335, the AP sleeps during its inactive period (as indicated by the duty cycle). As discussed above, in some embodiments, sleeping may correspond to refraining from transmitting and/or receiving data, but the AP may continue to perform other operations (such as determining an updated duty cycle) in some embodiments.

In the illustrated embodiment, the method 300 then returns to block 305 to determine an updated duty cycle (during or after the inactive period). Although the illustrated example depicts the AP determining and advertising an updated duty cycle each period (e.g., during each sleep time), in some embodiments, the AP may alternatively perform this duty cycle determination less often (e.g., every third cycle). That is, after block 335, the method 300 may return to block 310 (to advertise the previously determined duty cycle at the start of the next active period) and/or to block 315 (if the duty cycle is only advertised periodically, rather than at each active period). The method 300 may then return to block 305 subsequently, whenever the criteria to establish a new duty cycle are satisfied.

Figure 4:
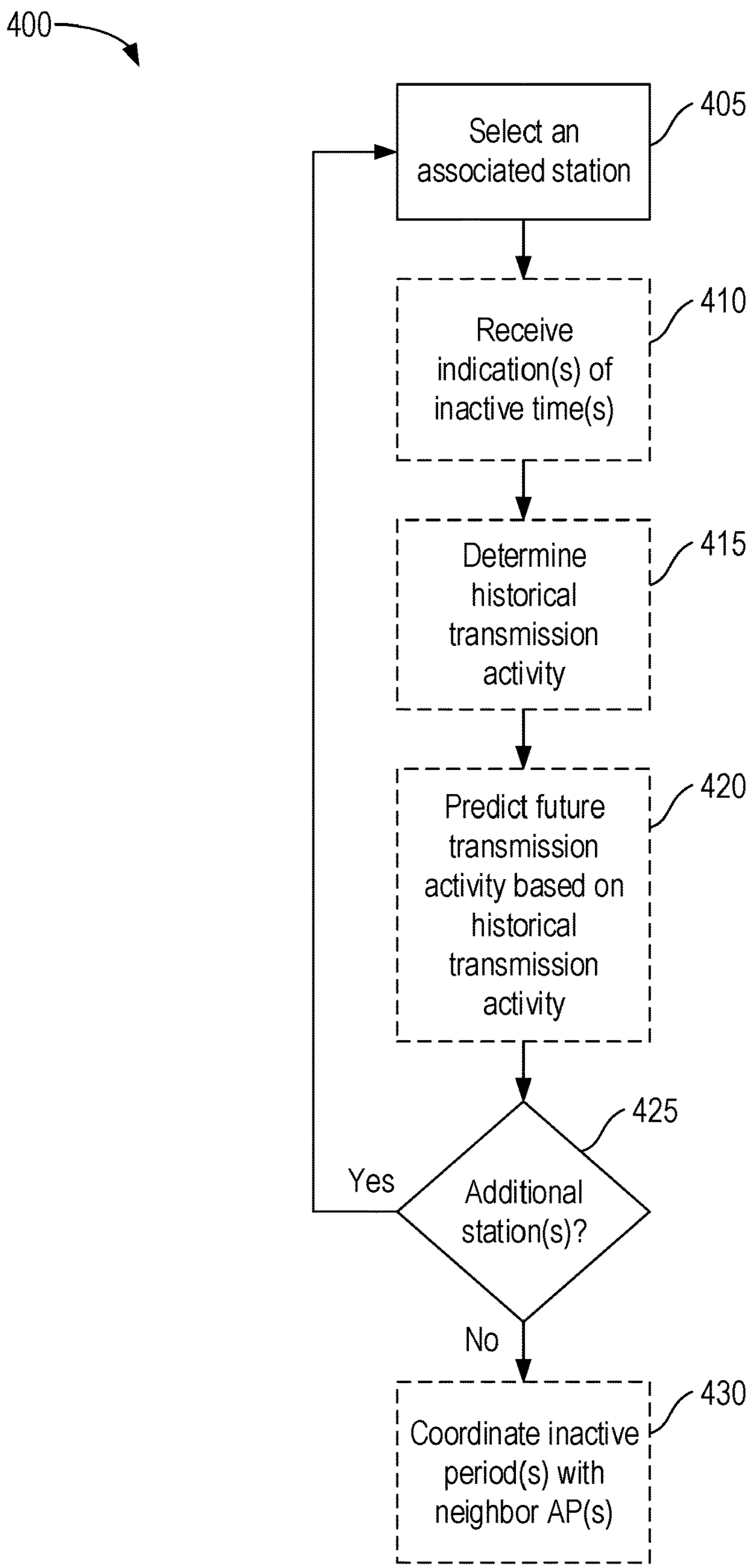
FIG. 4 is a flow diagram depicting an example method for determining AP duty cycling, according to some embodiments of the present disclosure.

FIG. 4 is a flow diagram depicting an example method 400 for determining access point duty cycling, according to some embodiments of the present disclosure. In some embodiments, the method 300 is performed by an AP, such as AP 110 of FIG. 1 and/or FIG. 2. In some embodiments, the method 400 provides additional detail for block 305 of FIG. 3.

At block 405, the AP selects an associated STA. That is, the AP selects one of the STAs that are currently associated to the AP. In some embodiments, the AP may additionally or alternatively select a STA that is expected to connect in the future (e.g., based on historical traffic information). Generally, the AP may use any suitable technique to select the STA, as the AP will review all associated STAs (and/or all predicted future STAs) during the method 400. Although an iterative method (e.g., selecting and evaluating each STA iteratively) is depicted for conceptual clarity, in some embodiments, the AP may select and evaluate some or all of the STAs entirely or partially in parallel.

At block 410, the AP optionally receives indication(s) of inactive time(s) for the selected STA. That is, the AP may receive predicted or planned transmission metrics or activity from the STA. Generally, the particular contents of this information may vary depending on the particular implementation. For example, in some embodiments, the AP receives an indication of times when the STA plans to sleep and/or wake (e.g., be in active and/or inactive transmission modes). In some embodiments, the AP receives an indication of the maximum inactive time (e.g., the maximum length of time without network connectivity) that the STA can experience before the operations of the STA are negatively affected beyond a threshold criteria.

At block 415, the AP optionally determines historical transmission activity of the selected STA. For example, as discussed above, the AP may determine the amount of data the STA historically transmits, the periodicity or timing of the transmissions, the length of time between adjacent transmissions (e.g., whether the STA generally transmits data continuously, every few minutes, every few hours, and the like), and the like.

At block 420, the AP optionally predicts future transmission activity of the selected STA based on the historical transmission activity. For example, in some embodiments, the AP may use forecasting models to predict future usage based on past usage. In some embodiments, the AP uses one or more machine learning models (e.g. an RNN, an LSTM, and the like) that have been trained to predict traffic activity.

In some embodiments, the AP accesses pre-trained model(s) to predict the future activity. In some embodiments, the AP (or another entity, such as the controller) may train these machine learning models using historical data. For example, in some embodiments, the AP may use data from a first window of time (e.g., a few hours) as input to generate a predicted traffic activity for a subsequent window of time. The AP may then compare this predicted activity for the subsequent window with the actual traffic activity from the subsequent window (e.g., a few minutes after the first window ended) to generate a loss, which can be used to refine the model(s). In some embodiments, other data such as the identifier of the STA, the type of the STA (e.g., what type of device it is), the time of day of the first or second windows, the day of the week of the first or second windows, and the like may similarly be used as input parameters during training and/or inferencing. In this way, the AP can train the model(s) to predict usage for a future time (e.g., the next few minutes) based on STA traffic from the past window (e.g., the past few minutes or hours) and/or based on other data such as the STA type, day of the week, and the like.

At block 425, the AP determines whether there is at least one additional STA for which the AP has not-yet received and/or predicted future traffic information. If so, the method 400 returns to block 405. If not, the method 400 continues to block 430.

At block 430, the AP optionally coordinates its duty cycle/inactive periods with one or more neighbor APs (if any). For example, as discussed above, the AP may determine a tentative duty cycle (e.g., a minimum length of each active period, a maximum length of each inactive period, and the like) based on the determined transmission activity of the associated STAs. In some embodiments, coordinating with neighbor APs may include, for example, aligning the duty cycles in time such at least one AP is active at any given time, aligning the duty cycles in time such that exactly one AP is active at any given time, adjusting the length(s) of active and/or inactive periods to allow the duty cycles to be synchronized, and the like. In some embodiments, by performing this coordination, the APs may collectively improve the operability and reliability of the network, reduce energy consumption, and/or enable shared use of the spectrum in the same physical area (at different times) without interference.

Figure 5:
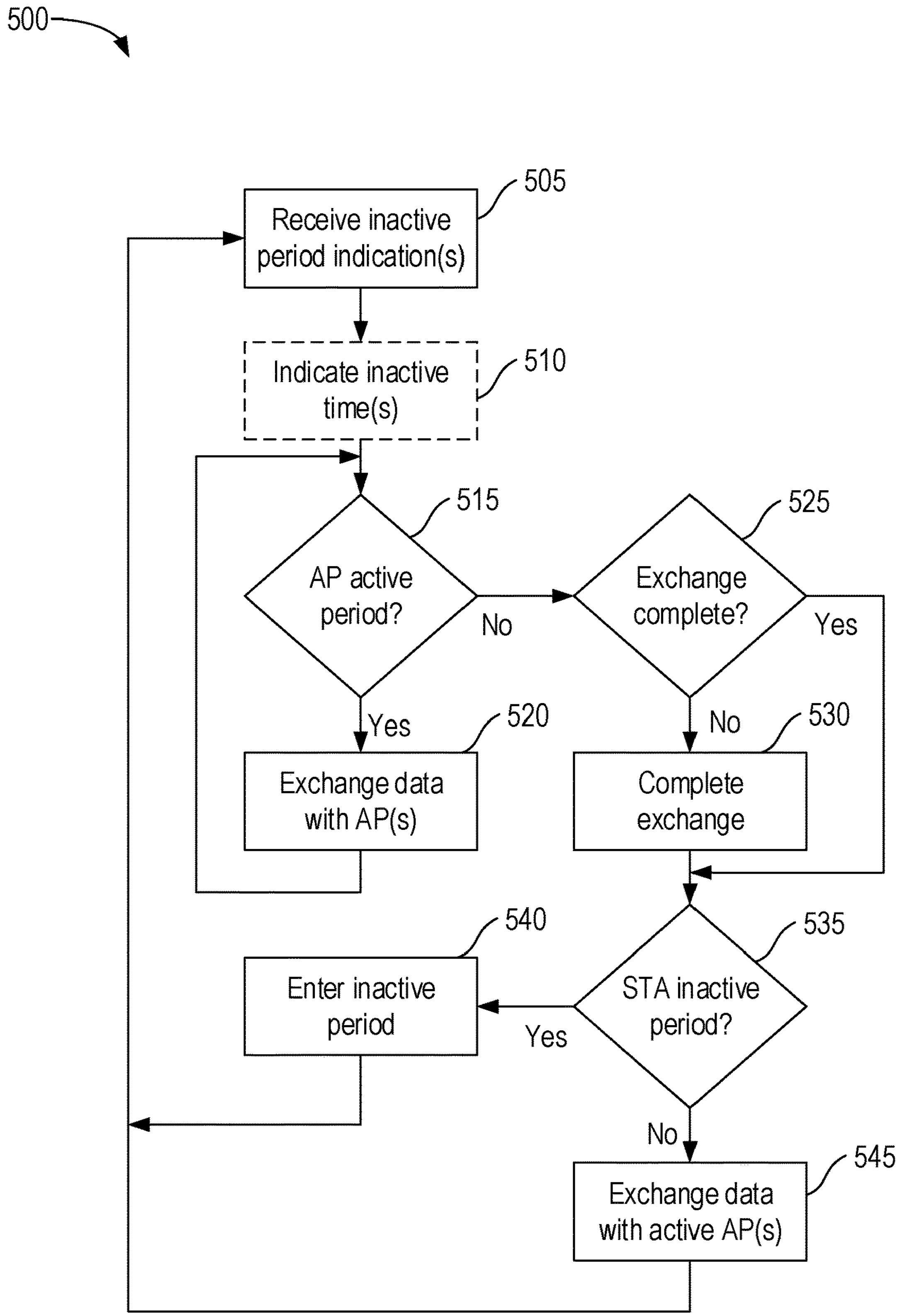
FIG. 5 is a flow diagram depicting an example method for communicating with duty-cycled APs, according to some embodiments of the present disclosure.

FIG. 5 is a flow diagram depicting an example method 500 for communicating with duty-cycled access points, according to some embodiments of the present disclosure. In some embodiments, the method 500 is performed by a STA, such as the STAs 115 of FIG. 1.

At block 505, the STA receives one or more indications of inactive period(s) and/or active period(s) from one or APs. For example, as discussed above, each AP may broadcast beacons that include indications of the future periods when the AP will be active, future periods when the AP plans to be inactive, and the like. In some embodiments, the STA can use these indications to determine which AP(s) to associate to (entirely, or at specific times). In other embodiments, the STA may be steered towards (or may select) the nearest AP (e.g., determined based on signal strength of the beacons).

At block 510, the STA optionally indicates its (maximum) inactive times, as discussed above. That is, the STA may signal its predicted or planned transmission metrics or activity to the AP. Generally, the particular contents of this information may vary depending on the particular implementation. For example, in some embodiments, the STA provides an indication of times when the STA plans to sleep and/or wake (e.g., be in active and/or inactive transmission modes). In some embodiments, the STA indicates the maximum inactive time (e.g., the maximum length of time without network connectivity) that the STA can experience before the operations of the STA are negatively affected beyond one or more threshold criteria. In some embodiments, the STA provides this information to all nearby APs (e.g., all APs from which the STA received an indication of their planned duty cycles). In some embodiments, the STA may transmit this information only to the AP to which it is associated.

At block 515, the STA determines whether the AP is in an active period (based on the advertised duty cycle). If so, the method 500 continues to block 520, where the STA exchanges data with the AP normally. The method 500 then returns to block 515, such that the STA can continue to exchange data with the AP until the active period ends.

If, at block 515, the STA determines that the AP is entering an inactive period (per the duty cycle), the method 500 continues to block 525. At block 525, the STA determines whether the exchange of data with the AP has completed. If not, in the illustrated example, the method 500 continues to block 530, where the STA completes its current transmissions. In some embodiments, rather than continuing the transmission, the STA may use frame preemption to interrupt the transmission, as discussed above.

After completing the transmission (or after using frame preemption), the method 500 continues to block 535. At block 535, the STA determines whether it is entering an inactive period. That is, the STA may determine whether it will also sleep during the AP's inactive period (e.g., refrain from exchanging data via the network, although the STA may optionally perform other operations offline during this time), or whether it will continue exchanging data via another AP. Generally, this determination may be made based on a variety of criteria, such as administrator configuration, the priority or lag tolerance of the STA and/or of applications running on the STA, and the like.

If, at block 535, the STA determines to stop data exchanges until the AP awakes, the method 500 continues to block 540, where the STA enters an inactive transmission period. The method 500 then returns to block 505. In some embodiments, the method 500 instead proceeds to block 515 (e.g., if the APs do not indicate duty cycles in every beacon or in every wake period).

If, at block 535, the STA determines to continue transmissions, the method 500 continues to block 545, where the STA exchanges data with one or more other APs that are in (or are entering) an active state, as discussed above. This may allow the STA to continue exchanging data with little or no interruption, even while APs use duty cycles to reduce energy consumption. In some embodiments, if the STA used frame preemption to interrupt an ongoing frame transmission, the STA may begin transmission of the remaining portion(s) of the frame to the new AP(s), allowing the APs (or controller) to recombine the frames as discussed above.

The method 500 then returns to block 505. In some embodiments, the method 500 instead proceeds to block 515 (e.g., if the APs do not indicate duty cycles in every beacon or in every wake period).

Figure 6:
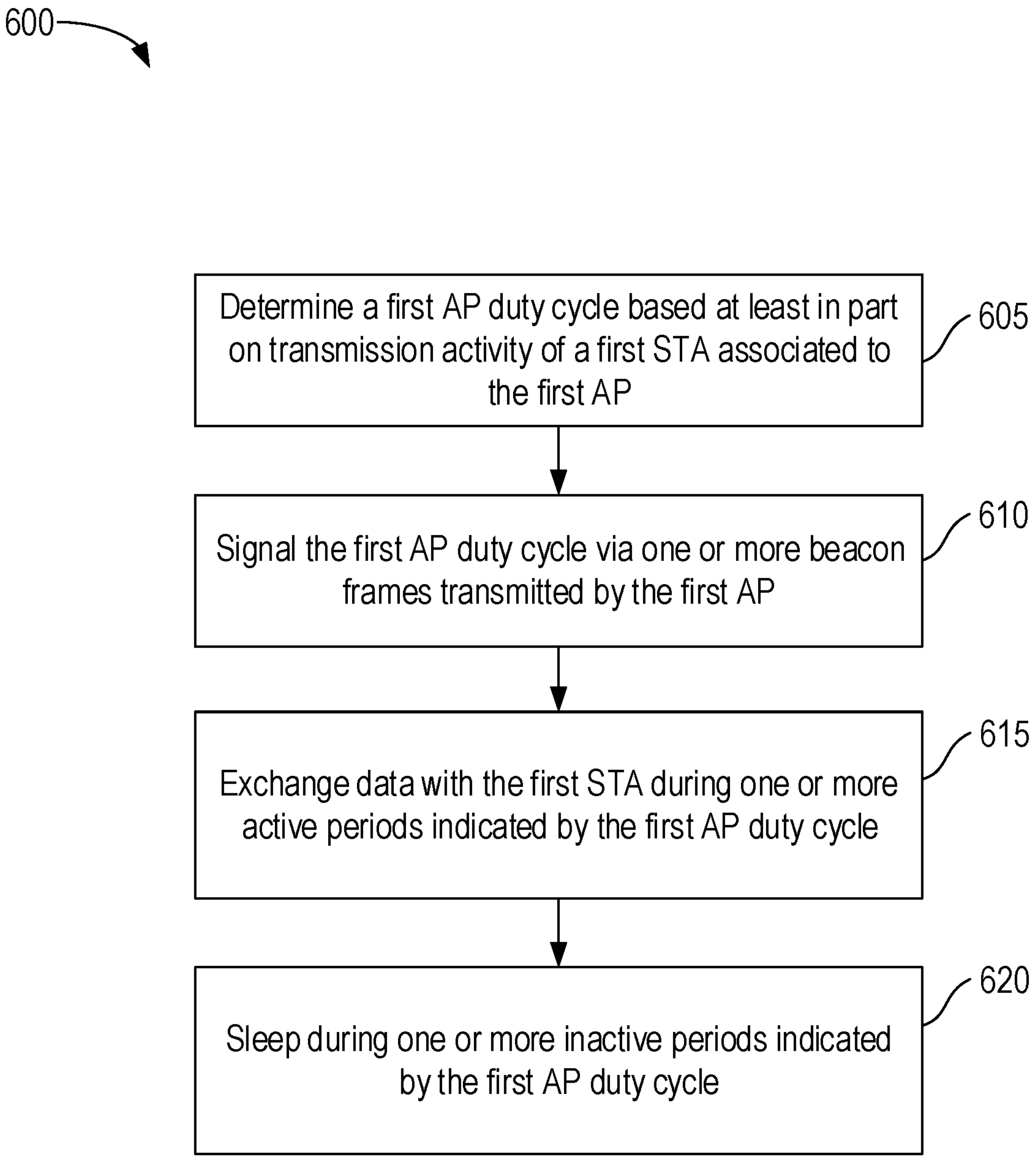
FIG. 6 is a flow diagram depicting an example method for AP duty cycling, according to some embodiments of the present disclosure.

FIG. 6 is a flow diagram depicting an example method 600 for access point duty cycling, according to some embodiments of the present disclosure. In some embodiments, the method 600 is performed by an AP, such as, AP 110 of FIG. 1 and/or FIG. 2.

At block 605, a first AP duty cycle is determined based at least in part on transmission activity of a first STA associated to the AP.

At block 610, the first AP duty cycle is signaled via one or more beacon frames transmitted by the AP.

At block 615, data is exchanged with the first STA during one or more active periods indicated by the first AP duty cycle.

At block 620, the AP sleeps during one or more inactive periods indicated by the first AP duty cycle.

Figure 7:
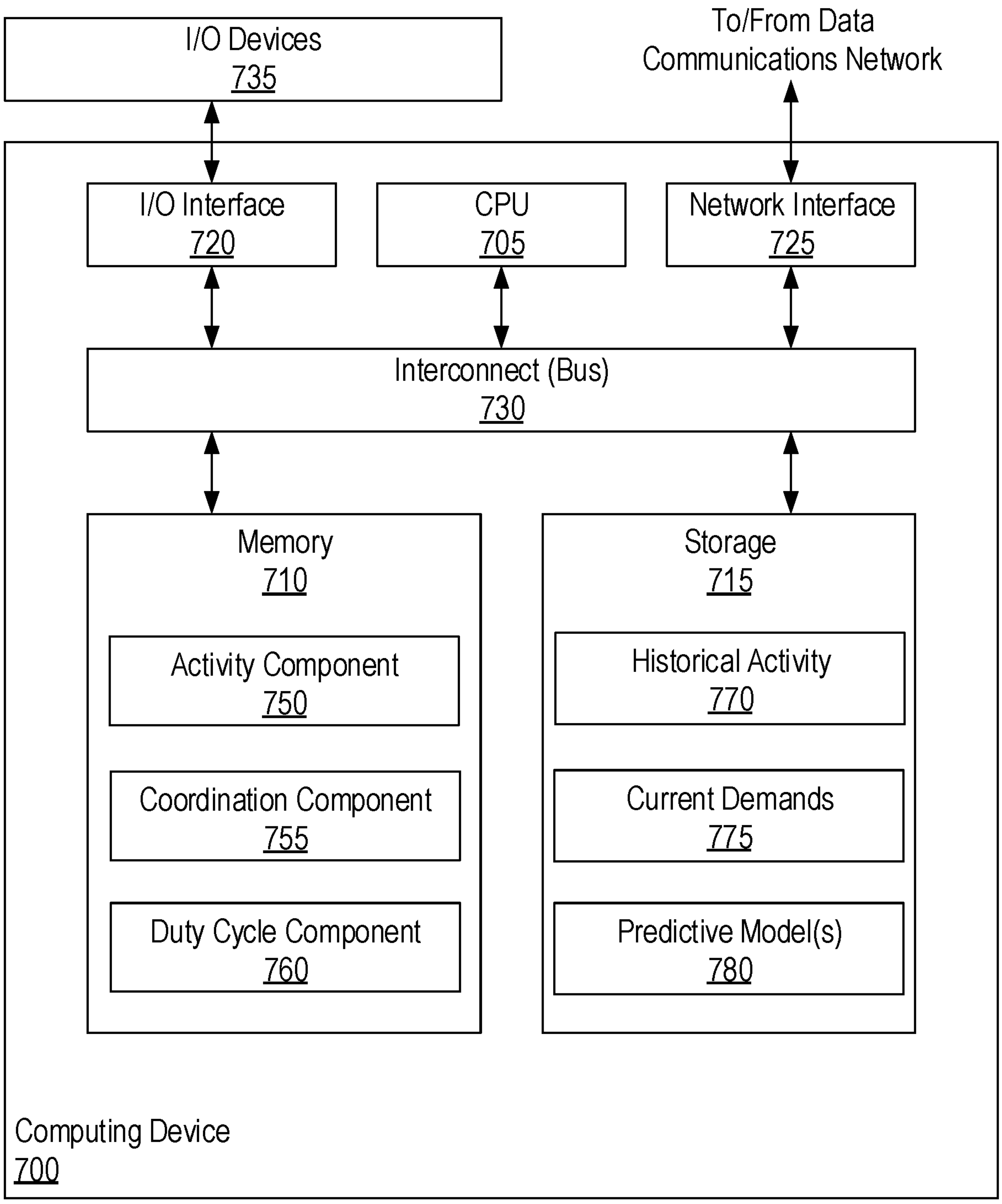
FIG. 7 depicts an example computing device configured to perform various aspects of the present disclosure, according to some embodiments of the present disclosure.

FIG. 7 depicts an example computing device 700 configured to perform various aspects of the present disclosure, according to some embodiments of the present disclosure. Although depicted as a physical device, in embodiments, the computing device 700 may be implemented using virtual device(s), and/or across a number of devices (e.g., in a cloud environment). In one embodiment, some or all of the computing device 700 corresponds to an AP, such as an AP 110 of FIG. 1 and/or FIG. 2. In some embodiments, some or all of the computing device 700 corresponds to a STA, such as STA 115 of FIG. 1.

As illustrated, the computing device 700 includes a CPU 705, memory 710, storage 715, a network interface 725, and one or more I/O interfaces 720. In the illustrated embodiment, the CPU 705 retrieves and executes programming instructions stored in memory 710, as well as stores and retrieves application data residing in storage 715. The CPU 705 is generally representative of a single CPU and/or GPU, multiple CPUs and/or GPUs, a single CPU and/or GPU having multiple processing cores, and the like. The memory 710 is generally included to be representative of a random access memory. Storage 715 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 735 (such as keyboards, monitors, etc.) are connected via the I/O interface(s) 720. Further, via the network interface 725, the computing device 700 can be communicatively coupled with one or more other devices and components (e.g., via a network, which may include the Internet, local network(s), and the like). As illustrated, the CPU 705, memory 710, storage 715, network interface(s) 725, and I/O interface(s) 720 are communicatively coupled by one or more buses 730.

In the illustrated embodiment, the memory 710 includes an activity component 750, a coordination component 755, and duty cycle component 760, which may perform one or more embodiments discussed above. Although depicted as a discrete component for conceptual clarity, in embodiments, the operations of the depicted component (and others not illustrated) may be combined or distributed across any number of components. Further, although depicted as software residing in memory 710, in embodiments, the operations of the depicted component (and others not illustrated) may be implemented using hardware, software, or a combination of hardware and software.

In one embodiment, the activity component 750 may be used to monitor, determine, and/or predict transmission or traffic activity of associated STAs, as discussed above. For example, the activity component 750 may receive and evaluate indications of future uptime needs (e.g., maximum downtime durations) from STAs, predict future transmission activity/uptime needs, and the like.

In one embodiment, the coordination component 755 may be used to coordinate duty cycles with neighboring APs, as discussed above. For example, the coordination component 755 may evaluate its own planned cycle (e.g., durations of uptime and downtime) and compare it to the cycles of other APs in order to synchronize the cycles (e.g., such that at least one AP is always active, such that exactly one AP is always active, and the like) if possible.

In one embodiment, the duty cycle component 760 may be used to define the duty cycle of the AP based on the transmission activity determined/predicted by the activity component 750 and/or based on coordination with other APs via the coordination component 755, as discussed above. For example, the duty cycle component 760 may finalize the uptime schedule and advertise it (e.g., via beacons) such that associated STAs can rely on the schedule to plan their own operations.

In the illustrated example, the storage 715 includes historical activity 770, current demands 775, and predictive model(s) 780. In some embodiments, the historical activity 770 generally indicates prior transmission activity of one or more STAs (which may include currently associated STAs and/or non-associated STAs), which the system (e.g., the activity component 750) may evaluate to predict or forecast future activity in order to define duty cycles. In some embodiments, the current demands 775 can correspond to indications or requests received form STAs, such as indicating their minimum active transmission durations, their maximum inactive transmission durations, and the like.

In some embodiments, the predictive models 780 generally correspond to one or more models (e.g., machine learning models or rules-based models) that can be used to predict future transmission activity based on prior activity (e.g., based on historical activity 770) as discussed above. Although depicted as residing in storage 715, the historical activity 770, current demands 775, and predictive models 780 may generally be stored in any suitable location, including memory 710.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments, and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method, or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:

determining, by a first access point (AP), a first AP duty cycle for a first window between a first time and a second time based at least in part on transmission activity of a first station (STA) associated to the first AP, wherein:

the first time corresponds to broadcast, by the first AP, of a first set of beacon frames, the second time corresponds to broadcast, by the first AP, of a second set of beacon frames, and the first AP duty cycle indicates a plurality of active periods for the first AP and one or more inactive periods for the first AP;

signaling the first AP duty cycle via the first set of beacon frames broadcast by the first AP; and exchanging data, by the first AP, in accordance with the first AP duty cycle, comprising:

exchanging data with the first STA during the plurality of active periods indicated by the first AP duty cycle; and sleeping, by the first AP, during the one or more inactive periods indicated by the first AP duty cycle;

determining, by the first AP, a second AP duty cycle for a second window of time between the second time and a third time; and signaling the second AP duty cycle via the second set of beacon frames broadcast by the first AP.

2. The method of claim 1, further comprising determining the transmission activity of the first STA based at least in part on signaling, from the first STA, indicating a maximum inactive communication time for the first STA.

3. The method of claim 1, further comprising predicting the transmission activity of the first STA based at least in part on processing historical transmission activity of the first STA using one or more predictive models.

4. The method of claim 3, wherein the one or more predictive models comprise one or more machine learning models trained, based on historical transmission activity, to predict future transmission activity.

5. The method of claim 1, wherein determining the first AP duty cycle is based further on coordinating AP duty cycles with a second AP such that active periods of the first AP duty cycle are non-overlapping with active periods of a second AP duty cycle used by the second AP.

6. The method of claim 5, further comprising steering, by the first AP, a second STA to the second AP in response to determining that the second STA is physically nearer to the second AP, as compared to the first AP.

7. The method of claim 1, further comprising:

determining, based on the first AP duty cycle, that a first inactive period has begun at a first point in time;

determining, by the first AP, that the first STA is transmitting data to the first AP at the first point in time; and refraining from sleeping at the first point in time in response to determining that the first STA is transmitting data to the first AP at the first point in time.

8. The method of claim 1, further comprising:

receiving, by the first AP, a first portion of a first frame from the first STA; and entering, by the first AP, an inactive period based on the first AP duty cycle, wherein:

the first AP transmits the first portion of the first frame to a controller, the first STA transmits a second portion of the first frame to a second AP during the inactive period, the second AP transmits the second portion of the first frame to the controller, and the controller recombines the first and second portions of the first frame.

9. A non-transitory computer-readable medium containing computer program code that, when executed by operation of one or more computer processors, performs an operation comprising:

determining, by a first access point (AP), a first AP duty cycle for a first window between a first time and a second time based at least in part on transmission activity of a first station (STA) associated to the first AP, wherein:

the first time corresponds to broadcast, by the first AP, of a first set of beacon frames, the second time corresponds to broadcast, by the first AP, of a second set of beacon frames, and the first AP duty cycle indicates a plurality of active periods for the first AP and one or more inactive periods for the first AP;

signaling the first AP duty cycle via the first set of beacon frames broadcast by the first AP; and exchanging data, by the first AP, in accordance with the first AP duty cycle, comprising:

exchanging data with the first STA during the plurality of active periods indicated by the first AP duty cycle; and sleeping, by the first AP, during the one or more inactive periods indicated by the first AP duty cycle;

determining, by the first AP, a second AP duty cycle for a second window of time between the second time and a third time; and signaling the second AP duty cycle via the second set of beacon frames broadcast by the first AP.

10. The non-transitory computer-readable medium of claim 9, the operation further comprising determining the transmission activity of the first STA based at least in part on signaling, from the first STA, indicating a maximum inactive communication time for the first STA.

11. The non-transitory computer-readable medium of claim 9, the operation further comprising predicting the transmission activity of the first STA based at least in part on processing historical transmission activity of the first STA using one or more predictive models, wherein the one or more predictive models comprise one or more machine learning models trained, based on historical transmission activity, to predict future transmission activity.

12. The non-transitory computer-readable medium of claim 9, wherein determining the first AP duty cycle is based further on coordinating AP duty cycles with a second AP such that active periods of the first AP duty cycle are non-overlapping with active periods of a second AP duty cycle used by the second AP.

13. The non-transitory computer-readable medium of claim 9, the operation further comprising:

determining, based on the first AP duty cycle, that a first inactive period has begun at a first point in time;

determining, by the first AP, that the first STA is transmitting data to the first AP at the first point in time; and refraining from sleeping at the first point in time in response to determining that the first STA is transmitting data to the first AP at the first point in time.

14. The non-transitory computer-readable medium of claim 9, the operation further comprising:

receiving, by the first AP, a first portion of a first frame from the first STA; and entering, by the first AP, an inactive period based on the first AP duty cycle, wherein:

the first AP transmits the first portion of the first frame to a controller, the first STA transmits a second portion of the first frame to a second AP during the inactive period, the second AP transmits the second portion of the first frame to the controller, and the controller recombines the first and second portions of the first frame.

15. An access point (AP), comprising:

one or more computer processors; and a memory containing a program which when executed by the one or more computer processors performs an operation, the operation comprising:

determining, by a first access point (AP), a first AP duty cycle for a first window between a first time and a second time based at least in part on transmission activity of a first station (STA) associated to the first AP, wherein:

the first time corresponds to broadcast, by the first AP, of a first set of beacon frames, the second time corresponds to broadcast, by the first AP, of a second set of beacon frames, and the first AP duty cycle indicates a plurality of active periods for the first AP and one or more inactive periods for the first AP;

signaling the first AP duty cycle via the first set of beacon frames broadcast by the first AP; and exchanging data, by the AP, in accordance with the first AP duty cycle, comprising:

exchanging data with the first STA during the plurality of active indicated by the first AP duty cycle; and sleeping, by the first AP, during the one or more inactive periods indicated by the first AP duty cycle;

determining, by the first AP, a second AP duty cycle for a second window of time between the second time and a third time; and signaling the second AP duty cycle via the second set of beacon frames broadcast by the first AP.

16. The AP of claim 15, the operation further comprising determining the transmission activity of the first STA based at least in part on signaling, from the first STA, indicating a maximum inactive communication time for the first STA.

17. The AP of claim 15, the operation further comprising predicting the transmission activity of the first STA based at least in part on processing historical transmission activity of the first STA using one or more predictive models, wherein the one or more predictive models comprise one or more machine learning models trained, based on historical transmission activity, to predict future transmission activity.

18. The AP of claim 15, wherein determining the first AP duty cycle is based further on coordinating AP duty cycles with a second AP such that active periods of the first AP duty cycle are non-overlapping with active periods of a second AP duty cycle used by the second AP.

19. The AP of claim 15, the operation further comprising:

determining, based on the first AP duty cycle, that a first inactive period has begun at a first point in time;

determining, by the AP, that the first STA is transmitting data to the AP at the first point in time; and refraining from sleeping at the first point in time in response to determining that the first STA is transmitting data to the AP at the first point in time.

20. The AP of claim 15, the operation further comprising:

receiving, by the AP, a first portion of a first frame from the first STA; and entering, by the AP, an inactive period based on the first AP duty cycle, wherein:

the AP transmits the first portion of the first frame to a controller, the first STA transmits a second portion of the first frame to a second AP during the inactive period, the second AP transmits the second portion of the first frame to the controller, and the controller recombines the first and second portions of the first frame.

* * * * *